United States Patent
Hudgins et al.

(10) Patent No.: US 7,794,157 B2
(45) Date of Patent: *Sep. 14, 2010

(54) WIRELESS TUNING AND RECONFIGURATION OF NETWORK UNITS INCLUDING OPTOELECTRONIC COMPONENTS

(75) Inventors: Clay E. Hudgins, Madison, AL (US); Daniel McGlynn, Albuquerque, NM (US)

(73) Assignee: Emcore Corporation, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/411,834

(22) Filed: Mar. 26, 2009

(65) Prior Publication Data

US 2009/0180775 A1    Jul. 16, 2009

Related U.S. Application Data

(63) Continuation-in-part of application No. 11/776,494, filed on Jul. 11, 2007.

(51) Int. Cl.
G02B 6/42    (2006.01)
H04J 14/00   (2006.01)
H04B 10/12   (2006.01)

(52) U.S. Cl. .............................. 385/88; 398/58; 398/66; 398/71

(58) Field of Classification Search ........................ None
See application file for complete search history.

(56) References Cited

U.S. PATENT DOCUMENTS

| 6,240,312 | B1 | 5/2001 | Alfano et al. |
| 6,917,288 | B2 * | 7/2005 | Kimmel et al. ............. 340/511 |
| 6,941,077 | B2 | 9/2005 | Aronson et al. |
| 6,952,531 | B2 | 10/2005 | Aronson et al. |
| 6,957,021 | B2 | 10/2005 | Aronson et al. |
| 6,990,324 | B2 | 1/2006 | Laroia et al. |
| 7,050,720 | B2 | 5/2006 | Aronson et al. |
| 7,058,310 | B2 | 6/2006 | Aronson et al. |
| 7,079,775 | B2 | 7/2006 | Aronson et al. |
| 7,149,430 | B2 | 12/2006 | Hosking et al. |
| 7,162,160 | B2 | 1/2007 | Aronson et al. |
| 7,184,668 | B2 | 2/2007 | Aronson et al. |
| 7,200,337 | B2 | 4/2007 | Hosking et al. |
| 7,302,186 | B2 | 11/2007 | Light et al. |
| 7,346,278 | B2 | 3/2008 | Aronson et al. |
| 2003/0053170 | A1 | 3/2003 | Levinson et al. |
| 2004/0197101 | A1 | 10/2004 | Sasser et al. |
| 2005/0196111 | A1 | 9/2005 | Burdick et al. |
| 2006/0045525 | A1 | 3/2006 | Lee et al. |
| 2007/0092257 | A1 | 4/2007 | Smith et al. |
| 2007/0140690 | A1 | 6/2007 | Aronson et al. |
| 2007/0263713 | A1 | 11/2007 | Aronson |
| 2008/0166131 | A1 | 7/2008 | Hudgins et al. |
| 2008/0298810 | A1 | 12/2008 | Crosby et al. |
| 2009/0119686 | A1 * | 5/2009 | Monroe ....................... 719/327 |
| 2009/0180775 | A1 | 7/2009 | Hudgins et al. |

* cited by examiner

*Primary Examiner*—Michelle R Connelly Cushwa

(57) ABSTRACT

A method for monitoring conditions or adjusting a communications transmission characteristic, such as the optical wavelength, in a network unit such as a server, data storage unit, router, or switch, using a portable terminal having wireless RF communications capability. In one embodiment, the network unit has a tunable laser subassembly for converting and coupling an information-containing electrical signal with an optical fiber for transmitting an optical signal. The portable terminal may utilize an RFID interrogator, and the network unit may have a dynamic RFID tag to communicate identification and status information.

20 Claims, 6 Drawing Sheets

WIRELESS TUNING AND RECONFIGURATION OF NETWORK UNITS INCLUDING OPTOELECTRONIC COMPONENTS

REFERENCE TO RELATED APPLICATIONS

This application is a continuation-in-part of U.S. patent application Ser. No. 11/776,494 filed Jul. 11, 2007.

This application is also related to U.S. patent application Ser. No. 12/394,199, filed Feb. 27, 2009, U.S. patent application Ser. No. 11/712,725, filed Mar. 1, 2007, and U.S. patent application Ser. No. 11/620,317 filed Jan. 5, 2007, all assigned to the common assignee.

BACKGROUND OF THE INVENTION

1. Field of the Invention

The invention relates to network units including, in some embodiments, optical communications devices, such as transmitters, receivers, and transceivers used in high throughput fiber optic communications links in local and wide area networks and storage networks, and in particular, in some embodiments, to wirelessly monitoring and tuning the operational wavelength of such devices or other communications parameters of the network unit.

2. Description of the Related Art

Communications networks have experienced dramatic growth in data transmission traffic in recent years due to worldwide Internet access, e-mail, and e-commerce. As Internet usage grows to include transmission of larger data files, including content such as full motion video on-demand (including HDTV), multi-channel high quality audio, online video conferencing, image transfer, and other broadband applications, the delivery of such data will place a greater demand on available bandwidth. The bulk of this traffic is already routed through the optical networking infrastructure used by local and long distance carriers, as well as Internet service providers. Since optical fiber offers substantially greater bandwidth capacity, is less error prone, and is easier to administer than conventional copper wire technologies, it is not surprising to see increased deployment of optical fiber in data centers, storage area networks, and enterprise computer networks for short range network unit to network unit interconnection.

Such increased deployment has created a demand for electrical and optical transceiver modules that enable data system units such as computers, storage units, routers, and similar devices to be optionally coupled by either an electrical cable or an optical fiber to provide a high speed, short reach (less than 50 or 100 meters) data link within the data center.

A variety of optical transceiver modules are known in the art to provide such interconnection that include an optical transmit portion that converts an electrical signal into a modulated light beam that is coupled to a first optical fiber, and a receive portion that receives a second optical signal from a second optical fiber and converts it into an electrical signal, and similar implementations employ one fiber for both optical signals, traveling in opposite directions. The electrical signals are transferred in both directions over electrical connectors that interface with the network unit using a standard electrical data link protocol.

The optical transmitter section of such transceiver modules includes one or more semiconductor lasers and an optical assembly to focus or direct the light from the lasers into an optical fiber, which in turn, is connected to a receptacle or connector on the transceiver to allow an external optical fiber to be connected thereto using a standard connector, such as SC, FC or LC. The semiconductor lasers are typically packaged in a hermetically sealed can or similar housing in order to protect the laser from humidity or other harsh environmental conditions. The semiconductor laser chip is typically a distributed feedback (DFB) laser with dimensions a few hundred microns to a couple of millimeters wide and 100-500 microns thick. For non-tunable lasers, the distributed feedback mechanism is commonly monolithically integrated into the laser gain cavity structure, resulting in an entire laser chip structure of the dimensions described above. For tunable lasers, a rapidly advancing technology, the distributed feedback mechanism may be physically external to the gain cavity structure, making the entire tunable laser much longer in one dimension than the laser chip dimensions described above, with specific dimensions varying widely among different tunable laser designs. The package in which they are mounted typically includes a heat sink or spreader, and has several electrical leads coming out of the package to provide power and signal inputs to the laser chips. The electrical leads are then soldered to the circuit board in the optical transceiver. The optical receive section includes an optical assembly to focus or direct the light from the optical fiber onto a photodetector, which in turn, is connected to a transimpedance amplifier/limiter circuit on a circuit board. The photodetector or photodiode is typically packaged in a hermetically sealed package in order to protect it from harsh environmental conditions. The photodiodes are semiconductor chips that are typically a few hundred microns to a couple of millimeters wide and 100 to 500 microns thick. The package in which they are mounted is typically from three to six millimeters in diameter, and two to five millimeters tall and has several electrical leads coming out of the package. These electrical leads are then soldered to the circuit board containing the amplifier/limiter and other circuits for processing the electrical signal.

Optical transceiver modules are therefore packaged in a number of standard form factors which are "hot pluggable" into a rack mounted line card network unit or the chassis of the data system unit. Standard form factors set forth in Multiple Source Agreements (MSAs) provide standardized dimensions and input/output interfaces that allow devices from different manufacturers to be used interchangeably. Some of the most popular MSAs include XENPAK (see www.xenpak.org), X2 (see www.X2msa.org), SFF ("small form factor"), SFP ("small form factor pluggable"), XFP ("10 Gigabit Small Form Factor Pluggable", see www.XFPM-SA.org), and the 300-pin module (see www.300pinmsa.org). Some transceiver modules or subassemblies may also be incorporated within the network unit itself, in some embodiments as a card inserted into a rack mounted system, or within the housing of a stand-alone network unit.

Customers and users of such modules are interested in small or miniaturized transceivers in order to increase the number of interconnections or port density associated with the network unit, such as, for example in rack mounted line cards, switch boxes, cabling patch panels, wiring closets, and computer I/O interfaces.

The identification of individual network units, modules or subassemblies in connection with adjusting the operating characteristics of such modules is an important consideration in network management. When customer requirements or network configurations or conditions change, users must reconfigure operational parameters of the components of the system.

Identification information, such as transceiver type, capability, serial number, or compatibility information may be stored, or be capable of being stored, in a transceiver (see, for example, U.S. Patent Application Publication 2003/0128411). However, such information is generally not readily accessible for adjusting the operational parameters of such individual components or modules.

SUMMARY OF THE INVENTION

1. Objects of the Invention

It is an object of the present invention to provide a network unit capable of optical communications with a wirelessly adjustable tunable wavelength.

It is also another object of the present invention to provide a subassembly for use in an optical fiber transmission system with a tunable laser transmitter and an RFID tag or transponder for wirelessly externally communicating identification, wavelength, and/or other operational data to an external device.

It is still another object of the present invention to provide a network unit with a wireless transceiver to be able to adjust one or more operational parameters of the network unit from an external network manager that is in wireless communication with the wireless transceiver in the network unit.

It is another object of the present invention to provide a method of adjusting the wavelength of an optical transceiver in a network unit by utilizing communications through a wireless RF interface.

It is also another object of the present invention to provide a method for identifying a network unit or module in an optical fiber transmission system using a portable terminal with a wireless communications interface to the network unit or module.

Some implementations or embodiments of the invention may implement or achieve fewer than all of the foregoing objects.

2. Features of the Invention

Briefly, and in general terms, the present invention provides a method for wirelessly adjusting an operational parameter of an optoelectronic portion of a network unit that couples an information system device with an optical fiber in a data communications network, including a fiber optical connector adapted for coupling with an external optic fiber for transmitting and/or receiving an optical signal; and an electro-optic subassembly disposed in said network unit coupled to the information system device for converting the electrical signal to or from a modulated optical signal corresponding to the electrical signals at a selectable wavelength, comprising determining the identity of the network unit and wirelessly transmitting a signal to the network unit for adjusting an operational parameter in the network unit for subsequent communications by the electro-optical subassembly.

In another aspect, the present invention provides a method for monitoring an operational parameter or condition of an optoelectronic portion of a network unit with a portable terminal, the network unit coupling an information system device with an optical fiber in a data communications network, and including a fiber optical connector adapted for coupling with an external optic fiber for transmitting and/or receiving an optical signal; and an electro-optic subassembly disposed in said network unit and coupled to the information system device for converting an electrical signal associated with the information system device to or from a modulated optical signal corresponding to the electrical signals, including wirelessly transmitting the identity of the network unit to the portable terminal; and wirelessly transmitting an alert signal to the portable terminal in the event an operational parameter in the network unit exceeds an operational range, or the network unit experiences a specified condition.

In another aspect, the present invention provides a data communication network including a plurality of network units and associated optical communication modules, each module having a tunable laser transmitter having a wavelength that is selectable from a set of wavelengths, and means for communicating to and from an external device such as a portable terminal using a selected or predetermined wireless RF protocol to allow the external device to determine the wavelength in use and/or to adjust the wavelength or other operational parameters of the module.

Some implementations of the present invention may incorporate or implement fewer of the aspects and features noted in the foregoing summaries.

Additional objects, advantages, and novel features of the present invention will become apparent to those skilled in the art form this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

BRIEF DESCRIPTION OF THE DRAWINGS

These and other features and advantages of this invention will be better understood and more fully appreciated by reference to the following detailed description when considered in conjunction with the accompanying drawings, wherein.

Figure 1:
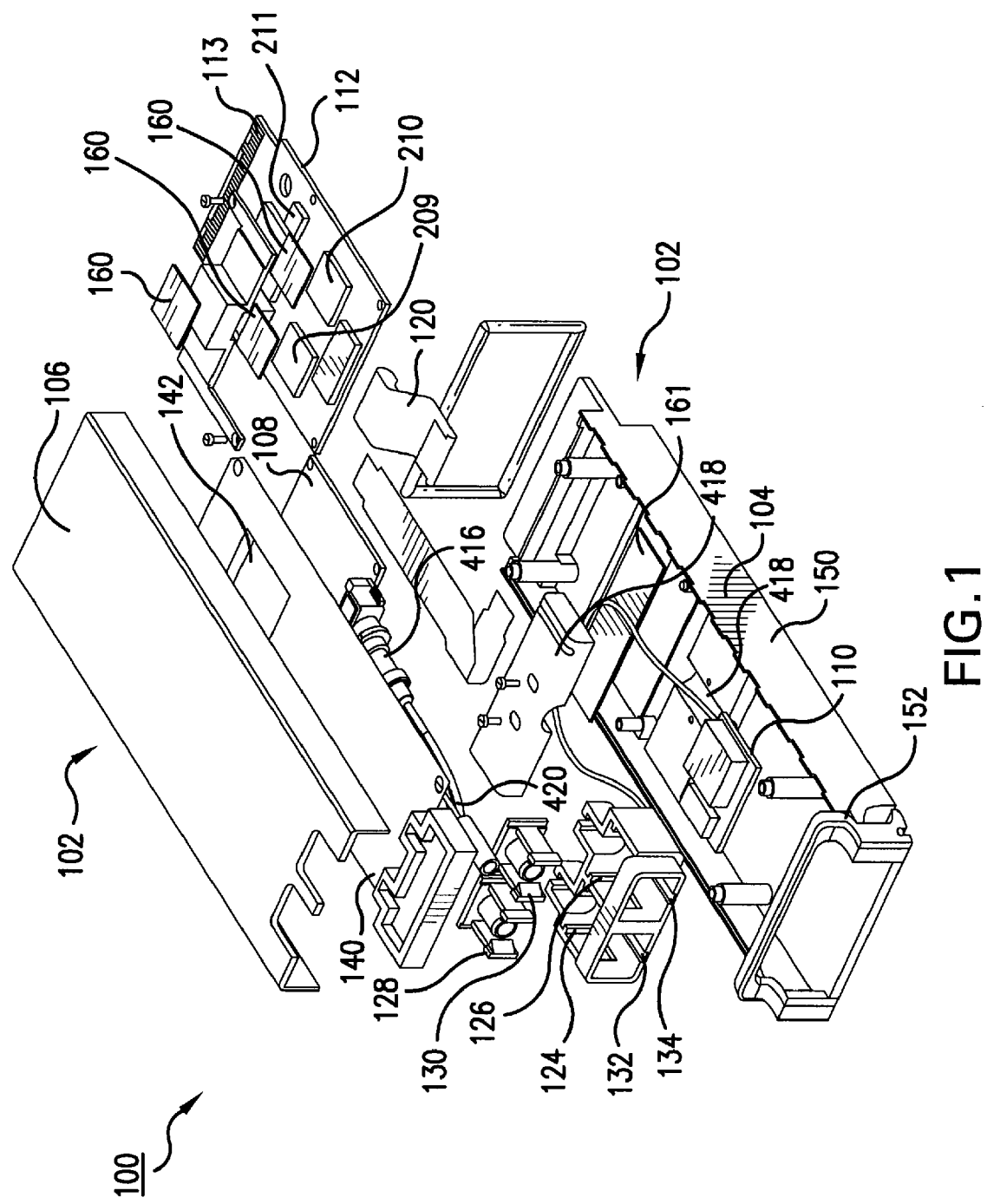
FIG. 1 is an exploded perspective view of an optoelectronic module in accordance with one embodiment of the invention.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of utility.

DESCRIPTION OF THE PREFERRED EMBODIMENT

Details of the present invention will now be described including exemplary aspects and embodiments thereof.

Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of the actual embodiment nor the relative dimensions of the depicted elements, and are not drawn to scale.

The present invention relates generally to the identification of network units including optical communications subassemblies or modules such as transmitters, receivers, and transceivers used in fiber optic communications systems, and the wireless adjustment of the operational wavelength or other operational parameters from a portable terminal situated in the general vicinity of the network unit. The network unit may be a router, switch, storage unit, server, or other data processing or communications unit and in some embodiments includes an electro-optical subassembly having an optical fiber interface.

Referring now to FIG. 1, there is shown an exploded view of one embodiment of an optical subassembly in the form of a pluggable optical transceiver module 100. In this particular embodiment, the module 100 is compliant with the IEEE 802.3 Physical Media Dependent sub-layer (PMD) and is implemented in the XFP form factor having a length of 78 mm, a width of 18.35 mm, and a height of 8.5 mm. It is to be noted, however, that in other embodiments the transceiver module 100 may be configured to operate under various other standard protocols (such as Fibre Channel or SONET) and be manufactured on a printed circuit card, or in a module housing in various alternate form factors such as XENPAK, X2, etc. In one embodiment, the module 100 is preferably a 10 Gigabit Wide Wavelength Division Multiplexed (WWDM) transceiver having a single tunable laser that enables 300 meter transmission of an optical signal at least 300 meters over a single legacy installed multimode fiber or a distance from 10 to 40 km over a single standard single mode fiber. U.S. Pat. No. 7,257,142 is hereby incorporated by reference to illustrate an example of one preferred tunable laser transmitter module.

The transceiver module 100 includes a two-piece housing 102 including a base 104 and a cover 106. In addition, contact strips (not shown) may be provided to ground the module to an external chassis ground as well. The housing 102 is constructed of die-case or milled metal, preferably die-cast zinc, although other materials also may be used, such as specialty plastics and the like. Preferably, the particular material used in the housing construction assists in reducing EMI.

The front end of the housing 102 includes a faceplate 131 for securing a pair of receptacles 124, 126. The receptacles, 124, 126 are configured to receive fiber optic connectors (not shown) which mate with optical plugs 128, 130 respectively. In the preferred embodiment, the connector receptacles 124, 126 are configured to receive industry standard LC duplex connectors. As such, keying channels 132, 134 are provided to ensure that the LC connectors are inserted into the receptacles 124, 126 in their correct orientation. Further, as shown in the exemplary embodiment and discussed further herein, the connector receptacle 124 is intended for an LC transmitter connector, and the connector receptacle 126 receives an LC receiver connector.

In one embodiment, the housing 102 holds three subassemblies or circuit boards, including a transmit board 108, a receive board 110, and a physical coding sublayer (PCS)/physical medium attachment (PMA) board 112, which is used to provide an electrical interface to external computer or communications units (not shown). The transmit subassembly includes a single tunable laser module, which may be mounted in a single, hermetically sealed enclosure 415, which interfaces to a fiber coupling subassembly 416. The transmit board 108 is secured in place at the bottom of the housing a brace 418 attached to the coupling subassembly 416. The brace also functions as a heat sink for dissipating heat from the metallic fiber coupling subassembly 416 and hermetically sealed enclosure 415. In addition, the transmit board 108 and receive board 110 are connected to the PCS/PMA board 112 by respective flex interconnects 121 and 120, or other board-to-board electrical connectors or cables. Thermally conductive gap pads may be provided to transmit the heat generated by the lasers or other components in the transmitter subassembly to the base 104 or cover 106 of the housing, both of which act as a heat sink. The receiver subassembly 110 is directly mounted on the housing base 104 using a thermally conductive adhesive to achieve heat dissipation. Different subassemblies therefore dissipate heat to different portions of the housing for a more uniform heat dissipation. The output optical signal from the four lasers is multiplexed and input into a single optical fiber 420 which coils and reverses direction, and is preferably attached or mounted on a flexible substrate 140. The flexible material may be an optical flexible planar material such as FlexPlane™ available from Molex, Inc. of Lisle, Ill., although other flexible substrates may be used as well. The optical fiber 420 originating from the transmitter subassembly is thereby routed to the transmit optical connector plug 130, which is attached to the faceplate 131, which is attached to the housing 102. The fiber is routed and attached in such a manner as to minimize sharp bends in the optical fiber to avoid optical loss and mechanical failure.

The flexible substrate 140 may include an opening 142 or hole in a portion of the material that is located directly above the retimer IC or other heat generating components mounted on the PCS/PMA board 112. The opening 142, which is substantially an area the size of the unused portion of the substrate 140, enables the cover 106 which acts as a heat sink, to contact a heat transmission gap pad 160, so as to provide access and a heat conductive path to the mounted components on the board 112. This area on the board 112 normally would be inaccessible if not for the opening 142. The gap pad 160 is installed without interfering with the routing of the optical fibers on the substrate 140 and without removing the mounted substrate 140 to allow access to the PCS/PMA board 112.

Although the embodiment described above is a pluggable 10 Gigabit WWDM transceiver, the same principles are applicable in other types of optical transceivers suitable for operating over both multimode (MM) and single mode (SM) fiber using single or multiple laser light sources, single or multiple photodetectors, and an appropriate optical multiplexing and demultiplexing system. The design is also applicable to a single transmitter or receiver module, or a module as either a transmitter, receiver, or transceiver to communicate over different optical networks using multiple protocols and satisfying a variety of different range and distance goals.

Although in the depicted embodiment the transceiver 100 is manufactured in a modular manner using three separate subassemblies mounted in the housing—a transmitter subassembly, a receiver subassembly, and a protocol processing board—with each subassembly or board having dedicated functions and electrically connected to each other using either flex circuitry or mating multipin connectors, land grid arrays, or other electrical interconnect devices, the invention may also be implemented in a transceiver having a single board or subassembly mounted inside a housing, or mounted on a printed circuit card inside a network unit.

Figure 2:
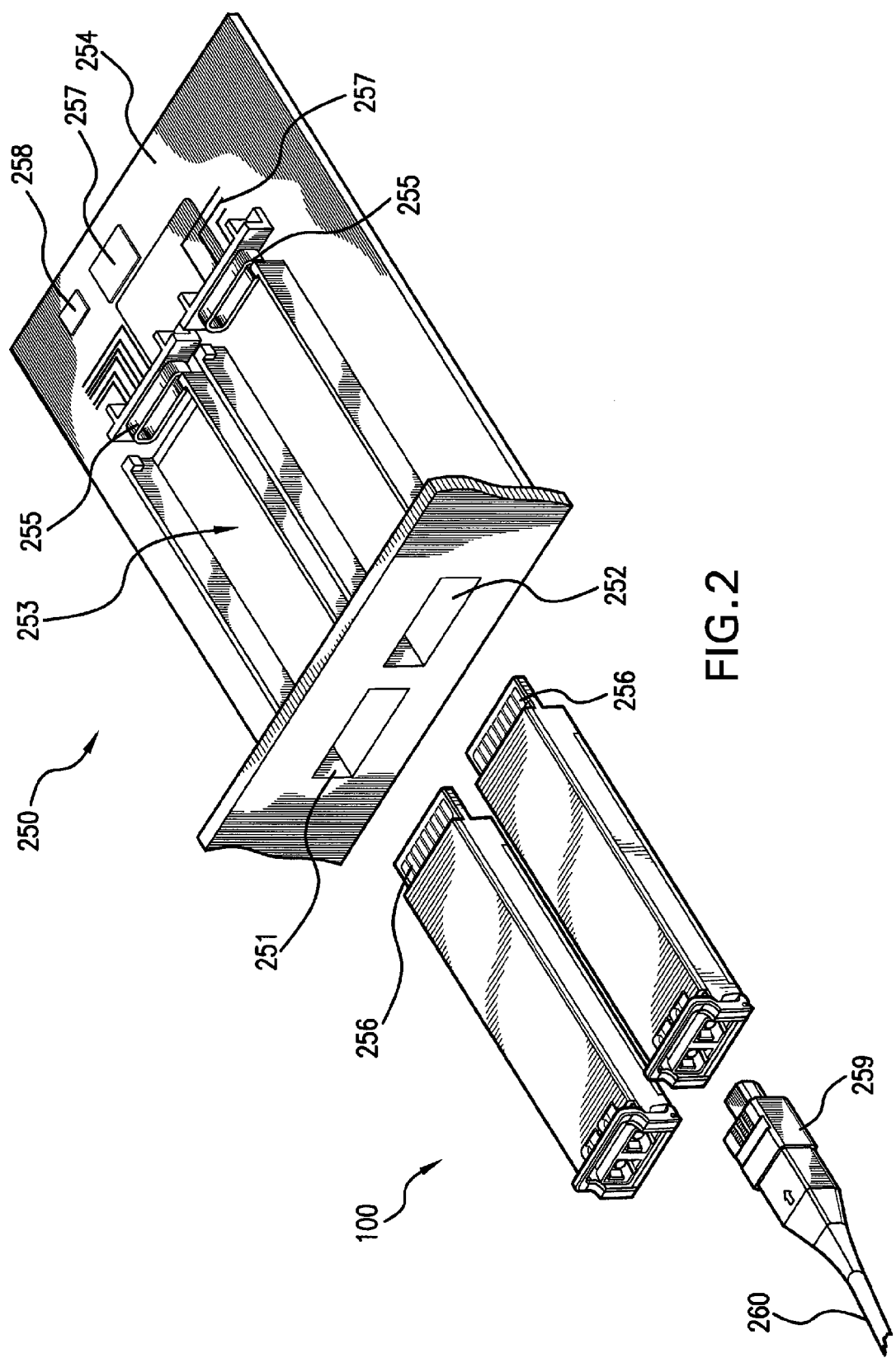
FIG. 2 is a perspective view of a module of FIG. 1 being inserted into a receptacle or cage in a host unit.

FIG. 2 is a perspective view of a module being inserted into a receptacle or cage in a host or network unit. The perspective view of the chassis 250 of the host unit or information system device for receiving a pluggable module according to the present invention depicts receptacles 251, 252 adapted for receiving a pluggable module 100, a cage 253 for securing the module adjacent to a printed circuit card 254, and an electrical connector 255 connected to the printed circuit card 254 and adapted for receiving the electrical connector 256 associated with the module. The printed circuit card 254 includes power and bus lines 257, a processor 258, and associated components such as memory 259. An optical cable connector 259 is employed to connect module 100 to the host optical cable plant 260. Although FIGS. 1 and 2 illustrate the embodiment of a pluggable module, in other embodiments the optoelectronic subassembly may be within the network unit itself, as more particularly described in connection with the preferred embodiment of the present disclosure.

Figure 3:
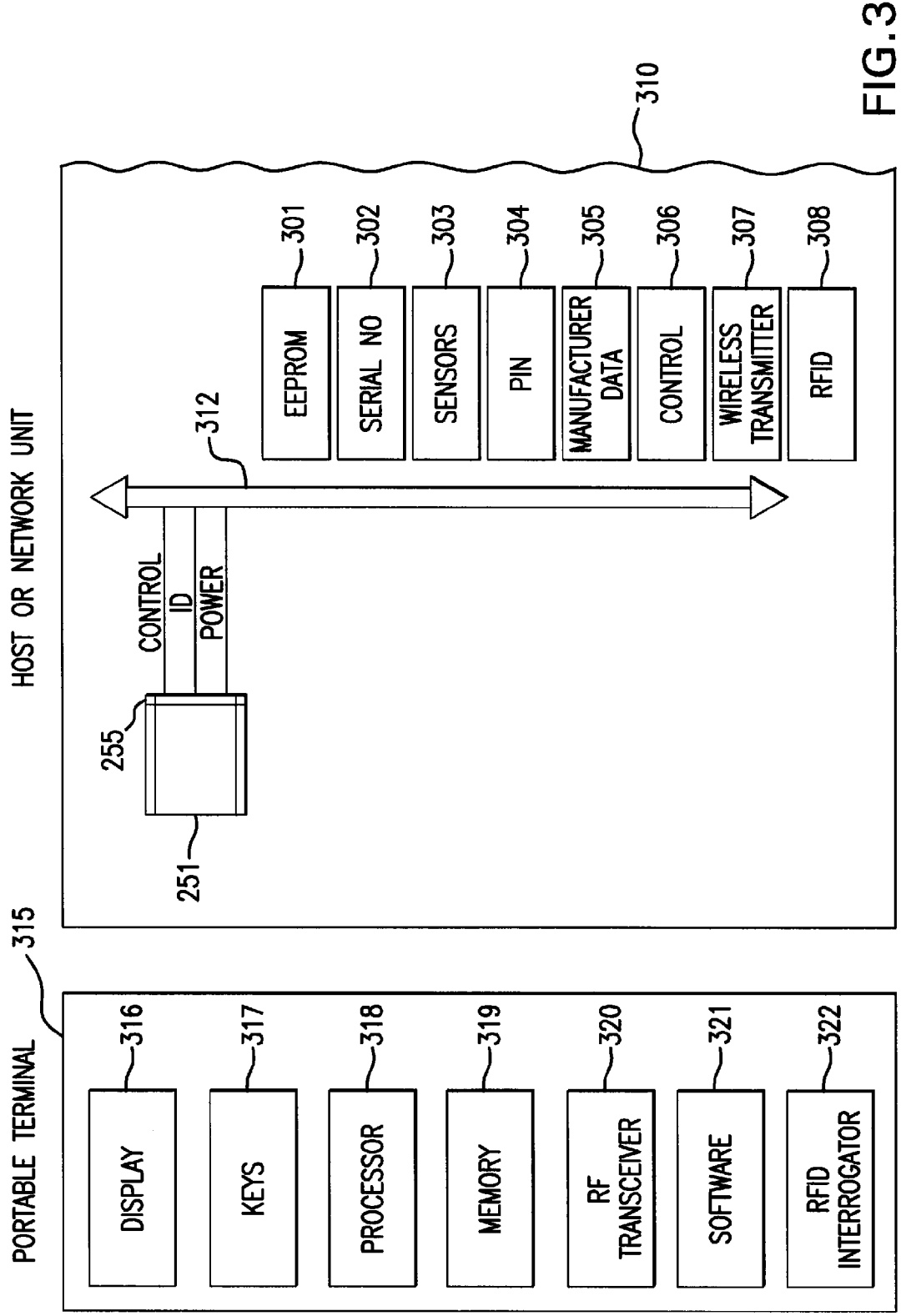
FIG. 3 is a highly simplified block diagram of certain elements of a network unit, including an optoelectronic subassembly, and a remote terminal.

FIG. 3 is a highly simplified block diagram of certain elements of a network unit 310 and a portable terminal 315. In particular, the network unit 310 may include an EEPROM 301 for temporarily storing parametric data, a serial number ROM 302 which contains the identity of the manufacturer and the manufacturer's serial number and type of the network unit. The sensors 303 may acquire various types of operational parametric data such as described in U.S. patent application Ser. No. 11/620,317, hereby incorporated by reference. A PIN or cryptographic key 304 may also be provided, which is utilized to verify the authorization of the terminal 315 and/or the network unit prior to authorizing operational changes to be made to the network unit, as described in parent application Ser. No. 11/776,494, hereby incorporated by reference.

Various operational control data, such as laser wavelength, output power, modulator or signal chirp, etc. may be acquired over time intervals, stored in look-up tables, or actively acquired in real time as controlled by subassembly 341. Control software 306 is provided to coordinate operation of the various stored, dynamically acquired or adjustable parameter items and the communications from the network unit 310 or the portable terminal 315. One or more wireless transceivers or receivers 307 may provide means for receiving control instructions via infrared or RF communication from the portable terminal 315, with a MAC address 340 being provided to the network unit. An RFID tag or transponder 308 may also be provided to store identification data.

In the embodiment including an electro-optical assembly in the network unit, a number of parameters of interest (POIs) may be collected in the network unit. For example a temperature, as well as the time rate of change of temperature, of the module body or case may be collected. Similarly a temperature, as well as a time rate of change, of the laser or LED within the body may be collected.

Other POIs may include a laser bias or modulation current and/or the digital setting that controls it. In the case of LEDs, a POI may include the LED drive current and/or the digital setting that controls it.

Error signals may also be collected and saved as POIs. Indications of bit errors on the fiber in the optical receive function may be retained. For example, coding errors detected in received blocks data, such as 8b10B or 64b/66b blocks of data. Indications of bit errors on incoming electrical signals that stimulate the module's optical transmission function may also be retained as POIs.

Indications of lower optical power in the optical receive function may be retained as a POI. For example, optical power below the receiver's specified capability or an optical power so low as to indicate a "dark" optical fiber, which is sometimes referred to as a loss of signal (LOS) condition.

All other things being said, semiconductor integrated circuits age more quickly at higher temperatures, as do organic materials. So, the history of Module Operating Temperature (MOT) will be of interest to the reliability analyst. Typically, some knowledge of temperature is available within an optical module because, as is well known, most optical modules employ a form of temperature compensation to adjust the drive settings of the optical emitter, which is typically a laser diode or an LED (light emitting diode). Either this existing resource or some additional specialized resource may be used to measure temperature.

The knowledge of time and temperature may together be used to measure the time-rate-of-change of temperature, which may be of interest since rapid temperature changes tend to be more stressful than slow changes. Additionally if desired, sensors may be added to measure mechanical stresses such as mechanical shock or mechanical strain. Additional Parameters of Interest (POI) may include internal settings specific to the optical module's design, such as digital potentiometer settings, laser drive settings, operational modes, et cetera.

Also of interest are the issues surrounding how to efficiently store the measured data within the module 10. The nonvolatile memory available in the optical module is a finite resource, and to make the most efficient use of the memory, the stored data should be compressed in some way. Lossless data compression techniques are well known, and certainly may be employed. Additionally, these data are highly suitable for lossy compression, because the measurements are not all of equal value.

For example, the maximum and minimum values of a given POI (e.g., temperature, shock, etc.) represent particularly valuable information, and dedicated storage locations may be allocated for those values. The time values at which such maxima and minima occur are important information, and so it is desirable to store ERT ad these values as ordered pairs, such as {ERT, POI-maxima} and {ERT, POI-minima}, and these time-measurement pairs are called time-tagged data.

A Media Access Control address (MAC address) is a unique identifier associated with a network adapter (NIC), such as a wireless local area network (WLAN) card plugged into a laptop computer. More particularly, it is a Level 2 address in the OSI layer architecture. It is a number that acts like a name for the associated network adapter, and thereby the host computer associated with the adapter.

As the name implies, a MAC address is associated with the media interface which the host unit or module is utilizing for communication. Thus, a MAC address associated with a wireless interface adapter (i.e. a wireless local area network link) could be different than the Ethernet address if the same host were connected over a wired Ethernet link.

Short-range wireless communication capability is becoming more widespread in use in a variety of different mobile devices such as portable terminals, cellular phones, personal digital assistants, pagers, MP3 players, and other mobile devices. Such devices may include short-range communication receivers or transceivers, so that the devices have the ability to communicate via RFID, Bluetooth, IEEE 803.11, IEEE 803.15, infrared or other types of short-range communication protocols dependent upon the application and type of receiver or transceiver associated with the mobile device.

Figure 5:
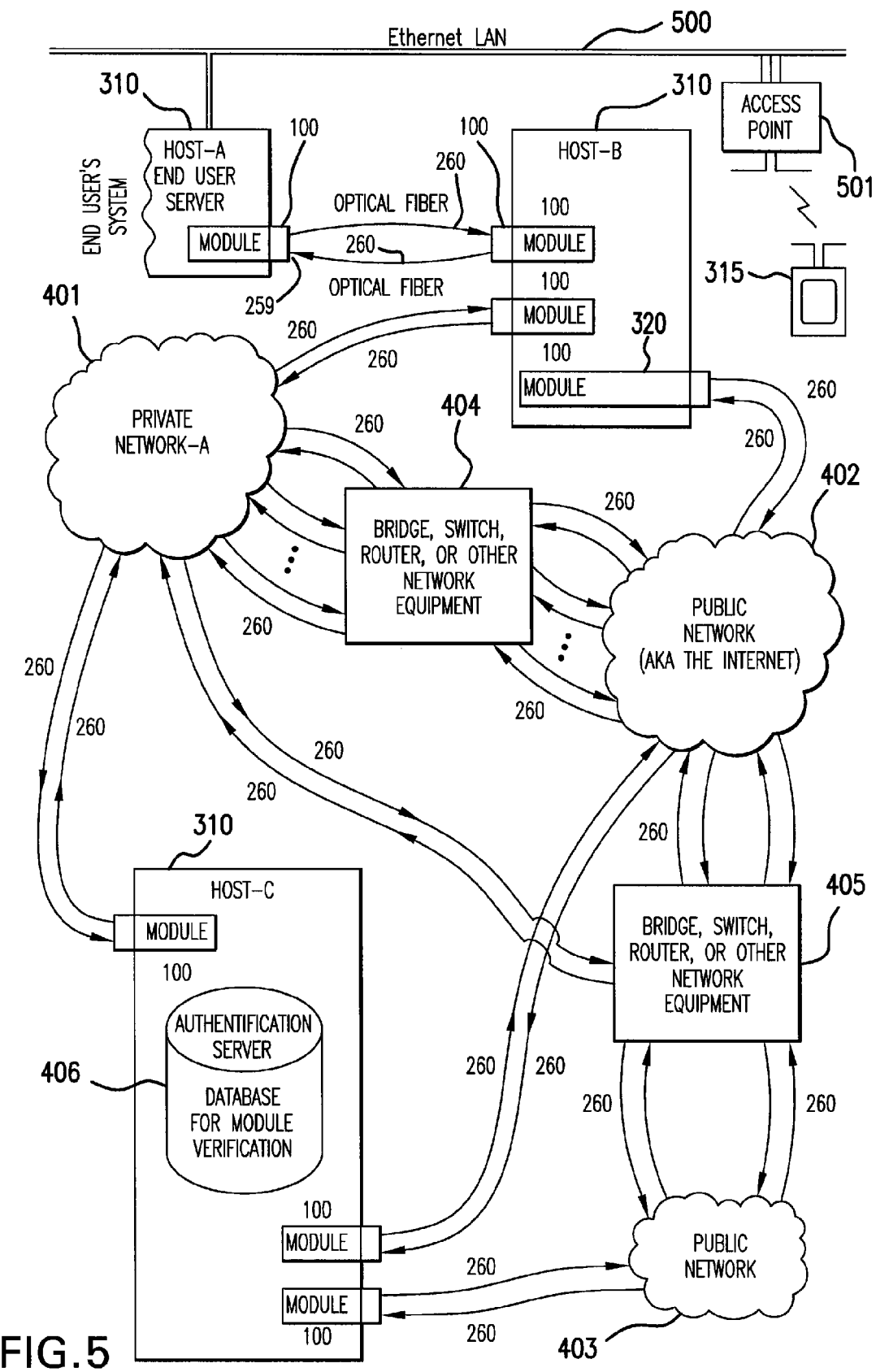
FIG. 5 is a highly simplified diagram of a computer network in which the present invention may be employed.

The portable terminal 315 is preferably equipped with short-range wireless LAN communication transceiver, so as to be capable of accessing both the network unit 310 and, if required in some embodiments, an external network (as depicted in FIG. 5) for further information and services.

The network unit 310 may include a slot or receptacle 251, 252 for insertion of a pluggable module 100 with an electrical connector 255 in the rear of the case 253 for mating with the electrical connector 256 on the module 100, or may include an optical fiber receptacle, with the components of the optoelectronic module 100 disposed interior to the network unit 310, as contemplated in the present disclosure and represented in FIG. 3. In this representation, there is also depicted a set of control and ID lines from each connector 255 or from the internal optoelectronic module connected to an internal bus 312 in the host unit 310. A power line 256 is also provided in host unit 310 which connects to each connector 255.

The portable terminal 315 may preferably include a display 316, keyboard or data entry buttons 317 (or touch screen display), a processor 318, memory 319, an infrared or RF transceiver 320, and an RFID interrogator 322. Software 321 is also provided for a variety of operations and applications to be subsequently described.

One aspect or embodiment of the present invention is that operational data associated with the network unit 310 may be transmitted to the portable terminal 315 operated by a technician or a network manager. The data may be transferred either along the wired connection from the network unit 310, or wirelessly by short range RF communication to and from the portable terminal 315 used in the vicinity of the network unit (i.e. in the same room or data center).

In addition to displaying the operational status and condition of a particular network unit, the software 321 in the terminal will allow the user to make operational changes in the module. By operational changes we include change of wavelength, change in launch power, change in modulation technique, chirp, error correction technique, payload size, communications protocol, packet control fields, encoding (e.g. 8B/10B), etc.

One aspect of the invention in some embodiments is the use of the RFID's Identifier Address/Code as a value written within the address space of the network unit. The RFID tag and RFID tag reader are conventionally thought of as a separate system from the device to which the RFID tag is attached.

Specifically, in one aspect or embodiment, the present invention associates or relates one particular network unit 310 and one particular RFID tag contained therein.

The Bluetooth protocol is one example of a protocol for the data communication, subject to certain limitations in address space and network size. RFID protocols may be preferred for identifying the modules, and its 96 bit address space seems appropriate for the environment where manufacturers will want to identify their products both by a unique Universal Product Code (UPC) plus their own unique serial number.

Indeed, Bluetooth (see the Bluetooth Special Interest Group homepage at http://www.bluetooth.org/) is preferred for radio frequency (RF) communication with a network unit, except for architectural limitations in network size, typically eight devices to a piconet. (http://en.wikipedia.org/wiki/Bluetooth, http://www.bluetooth.com/Bluetooth/Technology/Works/Communications_Topology.htm). Other than certain scale limitations (e.g., 48 bit total address space) and small piconet (3 bit address space), Bluetooth is preferred for communication with the network unit, with advantages including:

(a) frequency hopping spread spectrum communication for good electromagnetic noise avoidance/immunity in crowded equipment rooms.

(b) low power (1 mW) frequency hopping spread spectrum communication for minimal electromagnetic interference/noise generation in crowded equipment rooms.

(c) variable power transmission (1 mW, 2.5 mW, and 100 mW) for different applications; and (d) low cost due to high commercial acceptance.

Concerning address space, some manufacturers may be expected to wish to identify their product by its UPC (Universal Product Code) now or in the future the superset of UPC called EAN-13 (European Article Number) as standardized by the international standards body GS1 (http://www.gs1.org/). Even taking the simpler UPC code requires approximately 1E+12 (1 followed by 12 zeros, one trillion) combinations. Even the most clever possible use of the 48 bit Bluetooth address with the UPC code would leave less than 9 bits available for manufacturers' serial numbers (less than 512 unique serial numbers), which is clearly inadequate. So, Bluetooth's 48 bit address space seems inadequate to uniquely address manufactured items such as network units by UPC code and serial number.

In contrast, use of the 96 bit RFID address space with even an inefficient packing of the 17 decimal digit EAN-13 product code will leave over 39 bits for manufacturer serial numbers, which represents over one-half trillion available unique serial numbers per unique product number. So, RFID's 96 bit address space seems more than adequate to uniquely address manufactured items such as XFP modules by UPC/EAN-13 code and serial number.

Seeing then that the RFID has desirable and sufficient address space and that the Bluetooth system has desirable and sufficient wireless networking capabilities for the task at hand, one embodiment or aspect of the invention is to combine the use of both technologies for controlling and interrogating network units with a portable terminal.

The end application as contemplated by the present invention, is for a "user" (i.e., a human technician, engineer, operator, but as used herein may also include a computer program, etc.) to be able to walk into a network operating center carrying a battery powered Network Manager device (e.g., the portable terminal 315) that contains both a Bluetooth controller and an RFID reader. As the Network Manager is alerted by or queries individual RFID tags (which are part of the network units) the Bluetooth systems within those network units wake up and make themselves available for pairing. The Network Manager's Bluetooth Controller may then pair or associate with any network unit, using the RFID tag and its unique address to resolve any addressing ambiguities with other network units by ambiguity resolution techniques that are already well known to those skilled in the art. Once the Network Manager's Bluetooth Controller has paired with a particular network unit's Bluetooth Controller, the network unit's address space contains a copy of the RFID's ID value, which can used to complete the verification of the unique identity of the network unit.

Having done all this, the "User" and his/her hand-held battery powered Network Manager now have a unique Bluetooth connection with the network unit of interest or that they have chosen. Now, this full featured Bluetooth communication link may be used to control or interrogate/query any aspect of the network unit that one can imagine. The Bluetooth connection will have all the power and utility of the two wire interface (similar to Phillips I2C) that is often implemented in optoelectronic subassemblies or modules.

In short, this Bluetooth link can do everything that the normal 2-wire interface can do. This will include complete access to all management features including tuning of the lasers, and complete access to all embedded parametric monitoring data described in the related patent applications noted above.

In addition to the components noted above, portable terminals may utilize other data entry media such as magnetic stripe cards, RFID tags, biometric sources, SIM devices, smart cards, electronic key access cards, or the like, as well as a printer for providing a display or print-out of the information transmitted and/or received by the terminal.

Figure 4:
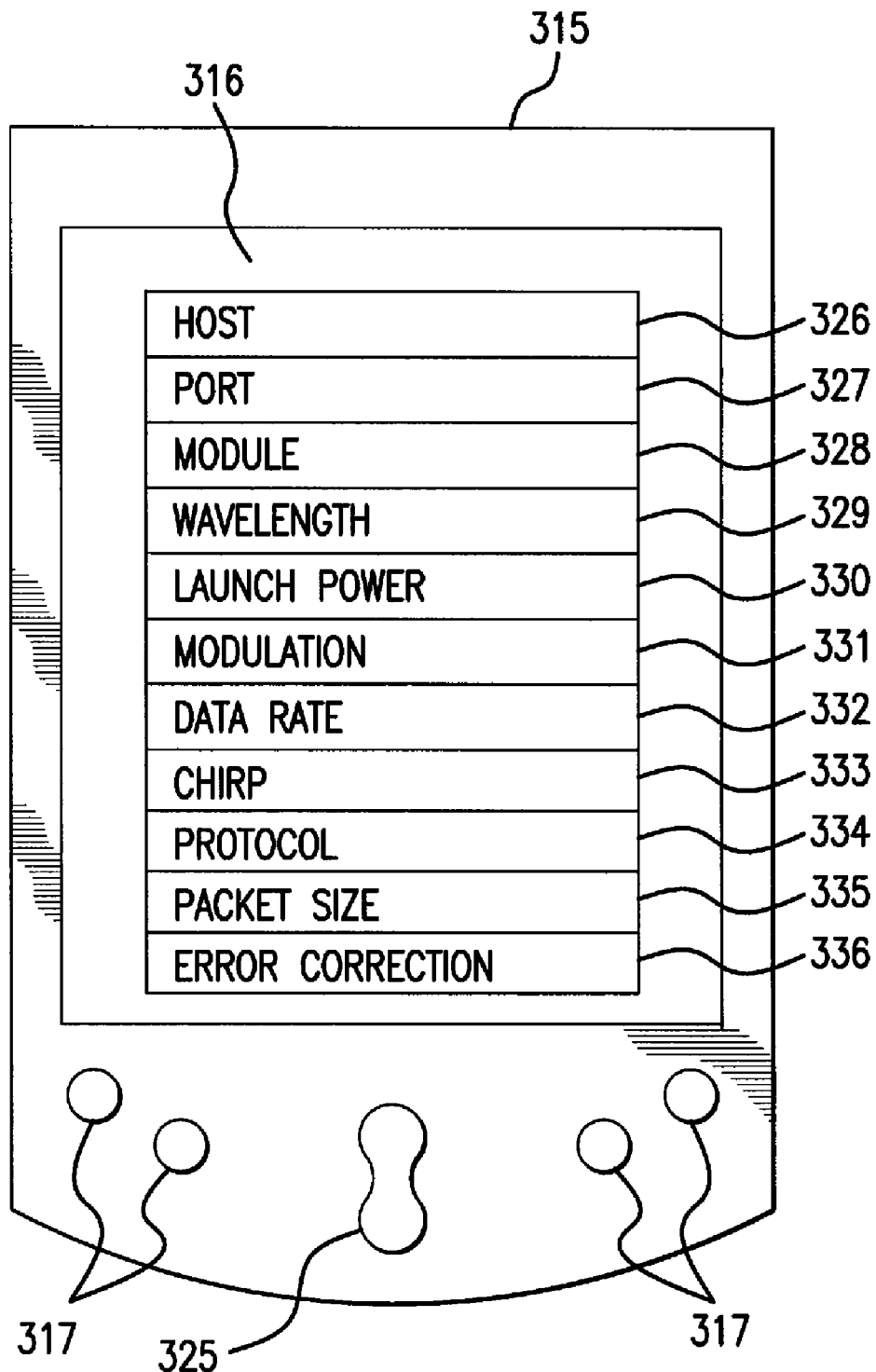
FIG. 4 is a top plan view of a portable terminal used in an embodiment of the present invention.

FIG. 4 is a top plan view of an embodiment of a portable terminal 315 with a display 316 depicting the various parameters and data that may be acquired in real time from the network unit by wireless transmission and displayed to the user, who may be a maintenance technician carrying or holding the portable terminal in the vicinity of the network units (and in RF communications with the network unit), and checking on the operational status and condition of the network units 310.

In one embodiment of the present invention, the network work periodically or continuously monitors certain operational parameters or operational conditions of the network unit, or processes associated with such operations. In the event the parameters exceed a specified range (either below a limit, or above a limit), or a specific condition is detected, an "alert" signal may be generated. The alert signal may also have a qualifying condition (e.g., "yellow", "orange", "red") depending upon the degree that the operational parameter has been exceeded, or the specific type of condition being detected. Some of the operational parameters may include elapsed time in use; elapsed time since last maintenance; internal temperature; component temperature; drive current; output optical power; error rate; CPU utilization; memory utilization; bandwidth utilization; port utilization; and quality of service, although others known to those in the art could be included as well. Specified conditions that may be monitored may include power failure; loss of output optical signals; and loss of received optical signal, or other conditions known to those in the art.

In particular, FIG. 4 depicts a variety of buttons 317, a scroll button 325, used to adjust the display. An example of the type of data that may be displayed when the portable terminal 315 is in communications range with one or more network units 310 includes identification of the network unit, identification of the port 327, identification of the module (e.g. by serial number or customer identification number) 328, identification of the wavelength in use by the network unit 329, the launch power 330, the modulation technique 331, the data rate 332, the chirp 333, the protocol 34, the packet size 335, and one or more other operational data fields 336 such as the error correction technique, payload size, etc.

FIG. 5 shows a computer or data communications network as might be employed in multi-site enterprise information systems, and a possible typical configuration or interconnection between a plurality of optoelectronic interfaces 100 associated with different network units or hosts, several hosts 310 (identified as Host-A, Host-B, and Host-C), a portable or mobile terminal 315, and an authentication server 406. In some instances, the optoelectronic interfaces 100 may be on the same private network 401 as the authentication server 406. In other cases, the network units 310 may connect directly to the public network 402, such as the Internet. An Ethernet LAN 500 may be associated with Host-A 310, including an access point 501.

Similarly, the authentication server may connect to the Internet 402 or one or more private networks 401, 403. When a module 100 and authentication server are on separate private networks, these private networks may be connected directly together by network equipment (bridge, router, or switch) 405.

Alternately, when the network unit 310 and authentication server 406 are on separate private networks 401, 403, these private networks may first connect to the Internet 402 via network equipment 404, 405 in order to form the necessary end-to-end connectivity between the module 100 and the authentication server 406.

Moreover, a plurality of authentication servers 406 may be distributed around the network for improved fault tolerance and/or improved speed of access. In the case of a plurality of authentication servers 406, these authentication servers will periodically synchronize their databases among themselves.

Figure 6:
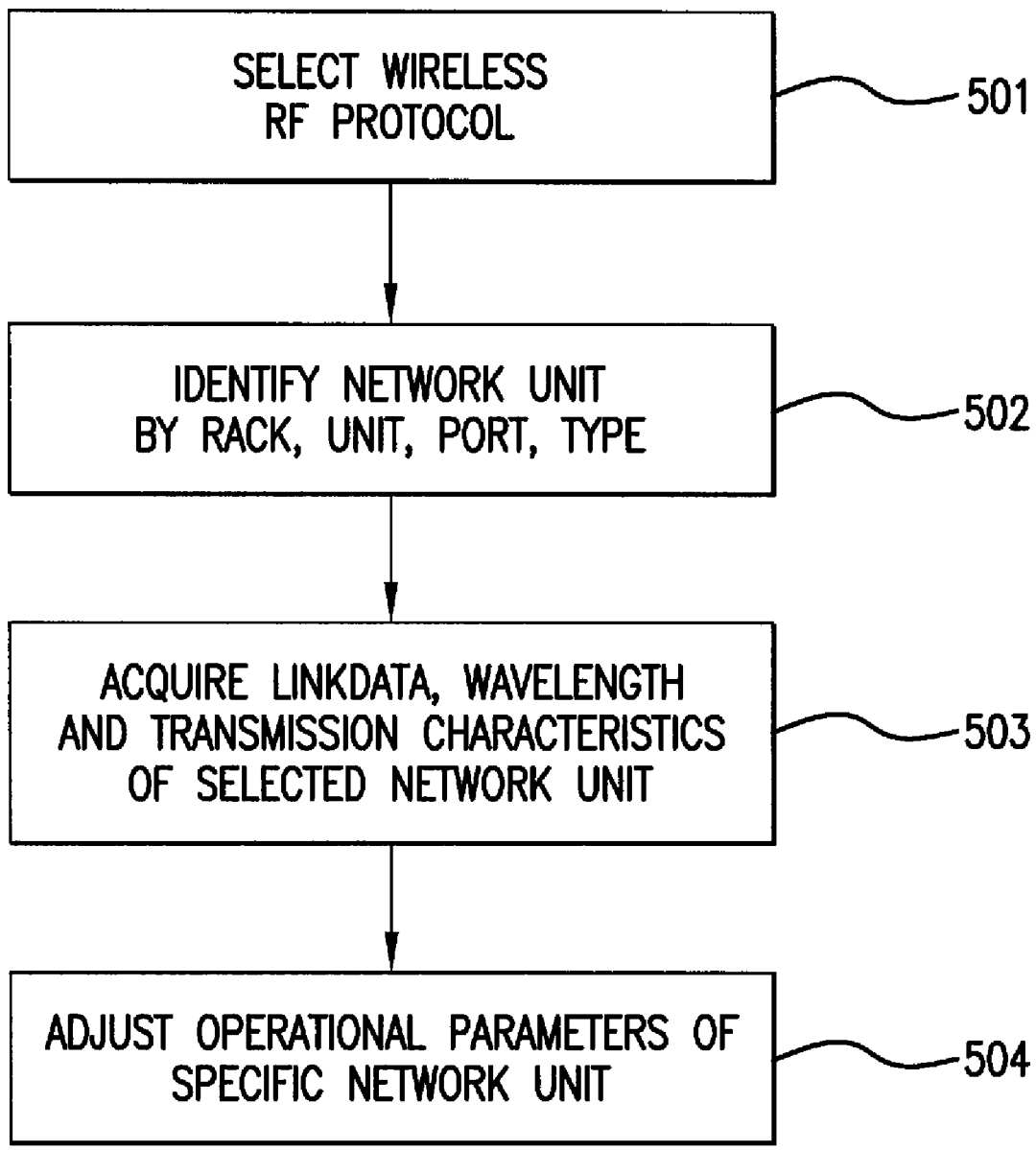
FIG. 6 is a flow chart depicting access of network units by a portable terminal.

FIG. 6 is a flow chart depicting the operations performed by the portable terminal 315 as used by a technician in a data center in checking or reconfiguring the network units during use. In particular, at step 501, the technician performs initialization by selecting the wireless protocol (e.g. RFID, Bluetooth, 802.11, 802.15, etc.). After scanning the network units within range by RFID tag interrogation, and displaying the identity of the network units 310 within range (e.g. by rack number, unit number, port number, type, and any "alert" or failure conditions associated with such units, etc.) the technician selects one network unit of interest, and the portable terminal acquires the link data, such as the wavelength and other transmission characteristics of the selected network unit or port at step 503.

If the network unit and/or network architecture is to be reconfigured, the technician can then adjust the operational parameters of the selected network units as may be required, as represented at step 504.

Various aspects of the techniques and apparatus of the present invention may be implemented in digital circuitry, or in computer hardware, firmware, software, or in combinations or them. Circuits of the invention may be implemented in computer products tangibly embodied in a machine-readable storage device for execution by a programmable processor, or on software located at a network node or web site which may be downloaded to the computer product automatically or on demand. The foregoing techniques may be performed by, for example, a single central processor, a multi-processor, one or more digital signal processors, gate arrays of logic gates, or hardwired logic circuits for executing a sequence of signals or program of instructions to perform functions of the invention by operating on input data and generating output. The methods may advantageously be implemented in one or more computer programs that are executable on a programmable system including at least one programmable processor coupled to receive data and instructions from, and to transmit data and instructions to, a data storage system at least one input device, and at least one output device. Each computer program may be implemented in a high-level procedural or object-oriented programming language, or in assembly or machine language if desired; and in any case, the language may be compiled or an interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in specially designed application-specific integrated circuits (ASICS).

It will be understood that each of the elements described above, or two or more together, also may find a useful application in other types of constructions differing from the types described above.

While the invention has been illustrated and described as embodied in a network unit including an optical subassembly, among other devices, it is not intended to be limited to the details shown, since various modifications and structural changes may be made without departing in any way from the spirit of the present invention.

While particular embodiments of the present invention have been shown and described, it will be understood by those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. A method for wirelessly adjusting an operational parameter of an optoelectronic portion of a network unit that couples an information system device with an optical fiber in a data communications network, the method comprising:
   determining an identity of the network unit; and
   wirelessly transmitting a signal to the network unit for adjusting an operational parameter in the network unit for subsequent communications, wherein the operational parameter identifies an error correction technique for correction of errors in the communications network, and wherein adjusting an operational parameter includes changing the error correction technique.

2. The method of claim 1, wherein the optical communications protocol used by the network unit is selected from the group consisting of SONET, Gigabit Ethernet, 10 Gigabit Ethernet, Fibre Channel and SDH.

3. The method of claim 1, wherein the steps of determining the identity and wirelessly transmitting is performed by a portable terminal using at least one RF communications protocol.

4. The method of claim 1, wherein the determining step utilizes a first communications protocol, and the transmitting step utilizes a second communications protocol, different from the first.

5. The method of claim 4, wherein the first communications protocol is RFID interrogation, and the second communications protocol is a wireless local area network protocol.

6. The method of claim 5, wherein the wireless local area network protocol is Bluetooth.

7. The method of claim 4, wherein both the first and the second wireless transmitting steps utilizes a RFID communications protocol.

8. A method for monitoring an operational parameter or condition of an optoelectronic portion of a network unit with a portable terminal, the network unit including a laser and coupling an information system device with an optical fiber in a data communications network, the method comprising:
   wirelessly transmitting the identity of the network unit to the portable terminal;
   wirelessly transmitting an alert signal to the portable terminal in the event an operational parameter in the network unit exceeds an operational range, or the network unit experiences a specified condition; and
   wirelessly transmitting a signal to the network unit to select a wavelength of the laser.

9. The method of claim 8, wherein at least one of wireless transmitting steps utilizes an RFID interrogation protocol.

10. The method of claim 8, wherein the optoelectronic portion is a pluggable module having a housing selected from the group consisting of XENPAK; X2, SFF, SFP, XFP, or QSFP form factors.

11. The method of claim 8, wherein the operational parameter is an error correction technique for correction of errors in the communications network.

12. The method of claim 8, wherein the transmitting the identity step utilizes a first communications protocol, and the transmitting an alert signal step utilizes a second communications protocol, different from the first communications protocol.

13. The method of claim 12, wherein one of the communications protocols is RFID interrogation, and the other communications protocol is a wireless local area network protocol.

14. The method of claim 13, wherein the wireless local area network protocol is Bluetooth.

15. The method of claim 12, wherein both the first and the second wireless transmitting steps utilizes different RFID communications protocols.

16. A method for monitoring an operational parameter or condition of an optoelectronic portion of a network unit with a portable terminal, the network unit including a laser and coupling an information system device with an optical fiber in a data communications network, the method comprising:
   wirelessly transmitting the identity of the network unit to the portable terminal utilizing a first communications protocol;
   wirelessly transmitting an alert signal to the portable terminal in the event an operational parameter in the network unit exceeds an operational range, or the network unit experiences a specified condition, utilizes a second communications protocol different from the first communications protocol; and wirelessly transmitting a signal from the portable terminal to the network unit for adjusting an operational parameter in the network unit for subsequent communications.

17. The method of claim 8, wherein the operational parameter is selected from the group consisting of: elapsed time in use; elapsed time since last maintenance; internal temperature; component temperature; drive current; output optical power; error rate; CPU utilization; memory utilization; bandwidth utilization; port utilization; and quality of service.

18. The method of claim 8, wherein the specified condition is selected from one or more of the group consisting of: power failure; loss of output optical signals; and loss of received optical signal.

19. A method of utilizing a portable terminal for monitoring an operational parameter or condition of a network unit, the network unit coupling an information system device with communications cable in a data communications network, comprising:

wirelessly transmitting the identity of the network unit to the portable terminal using a first communications protocol;

wirelessly transmitting an alert signal to the portable terminal in the event an operational parameter in the network unit exceeds an operational range, or the network unit experiences a specified condition, using a second communications protocol; and wirelessly transmitting a signal from the portable terminal to the network unit for changing the first or second communications protocol.

20. The method of claim 19, wherein one of the communications protocols is RFID interrogation, and the other communications protocol is a wireless local area network protocol.

* * * * *